United States Patent [19]

Dixon

[11] Patent Number: 4,864,199

[45] Date of Patent: Sep. 5, 1989

[54] ELECTRONICALLY CONTROLLED ELECTRIC MOTOR WITH VARIABLE POWER OUTPUT

[76] Inventor: Glen O. Dixon, 15020 S.E. 49th St., Bellevue, Wash. 98006

[21] Appl. No.: 220,742

[22] Filed: Jul. 18, 1988

[51] Int. Cl.$^4$ .......................... H02P 6/02; H02P 8/00
[52] U.S. Cl. .................................... 318/254; 318/685
[58] Field of Search ............... 318/138, 254, 439, 685, 318/696

[56] References Cited

U.S. PATENT DOCUMENTS

| | | | |
|---|---|---|---|
| 1,992,137 | 2/1935 | Zeininger . | |
| 2,404,331 | 7/1946 | Werner | 310/46 |
| 3,628,110 | 12/1971 | Casaday | 318/138 |
| 3,670,189 | 6/1972 | Monroe . | |
| 3,854,080 | 12/1974 | Bambara et al. | 318/436 |
| 4,262,240 | 4/1981 | Arai | 318/685 |
| 4,305,024 | 12/1981 | Kuroki . | |
| 4,357,551 | 11/1982 | Dulondel . | |
| 4,361,790 | 11/1982 | Laesser et al. . | |
| 4,455,515 | 6/1984 | Uzuka | 318/254 |
| 4,564,778 | 1/1986 | Yoshida . | |
| 4,686,437 | 8/1987 | Langley et al. | 318/138 X |
| 4,739,240 | 4/1988 | MacMinn et al. | 318/685 X |
| 4,777,419 | 10/1988 | Obradovic | 318/685 X |

Primary Examiner—Bentsu Ro
Attorney, Agent, or Firm—Larry A. Jackson

[57] ABSTRACT

Electric motors which utilize a combination of electromagnets and permanent magnets to effect relative rotation of motor components and have the following characteristics: (1) all of the magnets incorporated in one of the relatively rotatable motor components are permanent magnets, which are provided with power boost windings and are thus optionally convertible to electromagnets, and all of the magnets incorporated in the other of those components are electromagnets; (2) all of the convertible permanent magnets are oriented so that the same pole of each magnet (north or south) faces the air gap between that motor component which includes the convertible permanent magnets and the motor component in which the electromagnets of the motor are incorporated, whether functioning as a permanent magnet or as an electromagnet; (3) the relationship between the number of electromagnets (EM) and convertible permanent magnets (PM) is defined by the equation EM=PM+/−1, but where EM > or equal 3 and PM > or equal 3; (4) the electromagnets are wired in such a way that the poles facing the air gap can be either north or south and are varied in accordance with the predetermined sequences in the operator controlled programs; (5) the energization of the wirings in the electromagnets and in the convertible permanent magnets is controlled by switching electronics and an angle of rotation encoder to achieve predetermined rotational movement; and (6) the number of energized convertible permanent magnets and the number (and polarity) of energized electromagnets is varied to increase or decrease the amount of power output.

18 Claims, 7 Drawing Sheets (COUNTER CLOCKWISE-CONTINUOUS) GEAR #6

| POSITION NUMBER | ENERGIZED EM | REPELLING PM | ATTRACTING PM | AFFECTING EM | IDLE EM |
|---|---|---|---|---|---|
| 1 | 7,8,9,1 | 6,7,8,1 | 2,3,4,5 | 2,3,4,5 | 6 |
| 2 | 8,9,1,2 | 7,8,1,2 | 3,4,5,6 | 3,4,5,6 | 7 |
| 3 | 9,1,2,3 | 8,1,2,3 | 4,5,6,7 | 4,5,6,7 | 8 |
| 4 | 1,2,3,4 | 1,2,3,4 | 5,6,7,8 | 5,6,7,8 | 9 |
| 5 | 2,3,4,5 | 2,3,4,5 | 6,7,8,1 | 6,7,8,9 | 1 |
| 6 | 3,4,5,6 | 3,4,5,6 | 7,8,1,2 | 7,8,9,1 | 2 |
| 7 | 4,5,6,7 | 4,5,6,7 | 8,1,2,3 | 8,9,1,2 | 3 |
| 8 | 5,6,7,8 | 5,6,7,8 | 1,2,3,4 | 9,1,2,3 | 4 |
| 9 | 6,7,8,9 | 6,7,8,1 | 2,3,4,5 | 1,2,3,4 | 5 |
| 10 | 7,8,9,1 | 7,8,1,2 | 3,4,5,6 | 2,3,4,5 | 6 |

EM = ELECTROMAGNET
PM = PERMANENT MAGNET

Fig. 9.

GEAR #6
(CLOCKWISE – CONTINUOUS)

| DIRECTION/POSITION | POSITION NUMBER | ENERGIZED EM | REPELLING PM | ATTRACTING PM | AFFECTING EM | IDLE EM |
|---|---|---|---|---|---|---|
| CLOCKWISE | 1 | 1,2,3,4 | 1,2,3,4 | 5,6,7,8 | 6,7,8,9 | 5 |
| CLOCKWISE | 2 | 9,1,2,3 | 8,1,2,3 | 4,5,6,7 | 5,6,7,8 | 4 |
| CLOCKWISE | 3 | 8,9,1,2 | 7,8,1,2 | 3,4,5,6 | 4,5,6,7 | 3 |
| CLOCKWISE | 4 | 7,8,9,1 | 6,7,8,1 | 2,3,4,5 | 3,4,5,6 | 2 |
| CLOCKWISE | 5 | 6,7,8,9 | 5,6,7,8 | 1,2,3,4 | 2,3,4,5 | 1 |
| CLOCKWISE | 6 | 5,6,7,8 | 4,5,6,7 | 8,1,2,3 | 1,2,3,4 | 9 |
| CLOCKWISE | 7 | 4,5,6,7 | 3,4,5,6 | 7,8,1,2 | 9,1,2,3 | 8 |
| CLOCKWISE | 8 | 3,4,5,6 | 2,3,4,5 | 6,7,8,1 | 8,9,1,2 | 7 |
| CLOCKWISE | 9 | 2,3,4,5 | 1,2,3,4 | 5,6,7,8 | 7,8,9,1 | 6 |
| CLOCKWISE | 10 | 1,2,3,4 | 8,1,2,3 | 4,5,6,7 | 6,7,8,9 | 5 |

EM = ELECTROMAGNET   PM = PERMANENT MAGNET
CW = CLOCKWISE

Fig. 10.

GEAR #6
(OSCILLATING / REVERSING)

| DIRECTION/POSITION | POSITION NUMBER | ENERGIZED EM | REPELLING PM | ATTRACTING PM | AFFECTING EM | IDLE EM |
|---|---|---|---|---|---|---|
| CW | 1 | 1,2,3,4 | 1,2,3,4 | 5,6,7,8 | 6,2,8,9 | 5 |
| CW | 2 | 9,1,2,3 | 8,1,2,3 | 4,5,6,7 | 5,6,7,8 | 4 |
| CW | 3 | 8,9,1,2 | 7,8,1,2 | 3,4,5,6 | 4,5,6,7 | 3 |
| CCW | 4 | 9,1,2,3 | 8,1,2,3 | 4,5,6,7 | 4,5,6,7 | 8 |
| CCW | 5 | 1,2,3,4 | 1,2,3,4 | 5,6,7,8 | 5,6,7,8 | 9 |
| CCW | 6 | 2,3,4,5 | 2,3,4,5 | 6,7,8,1 | 6,7,8,9 | 1 |
| CW | 7 | 1,2,3,4 | 1,2,3,4 | 5,6,7,8 | 6,7,8,9 | 5 |
| CW | 8 | 9,1,2,3 | 8,1,2,3 | 4,5,6,7 | 5,6,7,8 | 4 |
| CW | 9 | 8,9,1,2 | 7,8,1,2 | 3,4,5,6 | 4,5,6,7 | 3 |
| CCW | 10 | 9,1,2,3 | 8,1,2,3 | 4,5,6,7 | 4,5,6,7 | 8 |

EM = ELECTROMAGNET   PM = PERMANENT MAGNET
CCW = COUNTER CLOCKWISE

Fig. 11.

(CLOCKWISE - STEPPING) GEAR #6

| DIRECTION/POSITION | POSITION NUMBER | ENERGIZED EM | REPELLING PM | ATTRACTING PM | AFFECTING EM | IDLE EM |
|---|---|---|---|---|---|---|
| CW | 1 | 1,2,3,4 | 1,2,3,4 | 5,6,7,8 | 6,7,8,9 | 5 |
| CW | 2 | 9,1,2,3 | 8,1,2,3 | 4,5,6,7 | 5,6,7,8 | 4 |
| CW | 3 | 8,9,1,2 | 7,8,1,2 | 3,4,5,6 | 4,5,6,7 | 3 |
| PAUSE | 4 | 8,9,1,2 | 7,8,1,2 | 3,4,5,6 | 4,5,6,7 | 3 |
| CW | 5 | 7,8,9,1 | 6,7,8,1 | 2,3,4,5 | 3,4,5,6 | 2 |
| CW | 6 | 6,7,8,9 | 5,6,7,8 | 1,2,3,4 | 2,3,4,5 | 1 |
| CW | 7 | 5,6,7,8 | 4,5,6,7 | 8,1,2,3 | 1,2,3,4 | 9 |
| PAUSE | 8 | 5,6,7,8 | 4,5,6,7 | 8,1,2,3 | 1,2,3,4 | 9 |
| CW | 9 | 4,5,6,7 | 3,4,5,6 | 7,8,1,2 | 9,1,2,3 | 8 |
| CW | 10 | 3,4,5,6 | 6,3,4,5 | 6,7,8,1 | 8,9,1,2 | 7 |

EM = ELECTROMAGNET   PM = PERMANENT MAGNET
CW = CLOCKWISE   CCW = COUNTER CLOCKWISE

Fig. 12.

(LOCKING AT REPRESENTATIVE POSITIONS)

| REPRESENTATIVE POSITION (1-72) | DIRECTLY ALIGNED MAGNETS (ENERGIZED) | ADDITIONAL STATOR EM (ENERGIZED) | ADDITIONAL ROTOR EM (ENERGIZED) |
|---|---|---|---|
| 1 | EMS1(S) EMR1(N) | EMS5(N) EMS6(N) | EMR5(N) |
| 8 | EMS8(S) EMR8(N) | EMS3(N) EMS4(N) | EMR4(N) |
| 15 | EMS6(S) EMR7(N) | EMS1(N) EMS2(N) | EMR2(N) |
| 22 | EMS4(S) EMR6(N) | EMS8(N) EMS9(N) | EMR8(N) |
| 29 | EMS2(S) EMR5(N) | EMS6(N) EMS7(N) | EMR6(N) |
| 36 | EMS9(S) EMR4(N) | EMS4(N) EMS5(N) | EMR3(N) |
| 43 | EMS7(S) EMR3(N) | EMS2(N) EMS3(N) | EMR1(N) |
| 50 | EMS5(S) EMR2(N) | EMS9(N) EMS1(N) | EMR7(N) |
| 57 | EMS3(S) EMR1(N) | EMS7(N) EMS8(N) | EMR5(N) |
| 64 | EMS1(S) EMR8(N) | EMS5(N) EMS6(N) | EMR5(N) |

EMS = ELECTROMAGNET-STATOR   (S) = SOUTH POLE TOWARD AIR GAP
EMR = ELECTROMAGNET-ROTOR   (N) = NORTH POLE TOWARD AIR GAP (STATOR/ROTOR POSITION FOR 1 FULL REVOLUTION)

| | DIRECTLY ALIGNED | | | DIRECTLY ALIGNED | | | DIRECTLY ALIGNED | |
|---|---|---|---|---|---|---|---|---|
| POSITION | STATOR | ROTOR | POSITION | STATOR | ROTOR | POSITION | STATOR | ROTOR |
| 1 | 1 | 1 | 25 | 7 | 1 | 49 | 4 | 1 |
| 2 | 2 | 2 | 26 | 8 | 2 | 50 | 5 | 2 |
| 3 | 3 | 3 | 27 | 9 | 3 | 51 | 6 | 3 |
| 4 | 4 | 4 | 28 | 1 | 4 | 52 | 7 | 4 |
| 5 | 5 | 5 | 29 | 2 | 5 | 53 | 8 | 5 |
| 6 | 6 | 6 | 30 | 3 | 6 | 54 | 9 | 6 |
| 7 | 7 | 7 | 31 | 4 | 7 | 55 | 1 | 7 |
| 8 | 8 | 8 | 32 | 5 | 8 | 56 | 2 | 8 |
| 9 | 9 | 1 | 33 | 6 | 1 | 57 | 3 | 1 |
| 10 | 1 | 2 | 34 | 7 | 2 | 58 | 4 | 2 |
| 11 | 2 | 3 | 35 | 8 | 3 | 59 | 5 | 3 |
| 12 | 3 | 4 | 36 | 9 | 4 | 60 | 6 | 4 |
| 13 | 4 | 5 | 37 | 1 | 5 | 61 | 7 | 5 |
| 14 | 5 | 6 | 38 | 2 | 6 | 62 | 8 | 6 |
| 15 | 6 | 7 | 39 | 3 | 7 | 63 | 9 | 7 |
| 16 | 7 | 8 | 40 | 4 | 8 | 64 | 1 | 8 |
| 17 | 8 | 1 | 41 | 5 | 1 | 65 | 2 | 1 |
| 18 | 9 | 2 | 42 | 6 | 2 | 66 | 3 | 2 |
| 19 | 1 | 3 | 43 | 7 | 3 | 67 | 4 | 3 |
| 20 | 2 | 4 | 44 | 8 | 4 | 68 | 5 | 4 |
| 21 | 3 | 5 | 45 | 9 | 5 | 69 | 6 | 5 |
| 22 | 4 | 6 | 46 | 1 | 6 | 70 | 7 | 6 |
| 23 | 5 | 7 | 47 | 2 | 7 | 71 | 8 | 7 |
| 24 | 6 | 8 | 48 | 3 | 8 | 72 | 9 | 8 |

POLES ENERGIZED FOR FIRST 9 POSITIONS
FOR EACH OF 6 GEARS

| POSITION | GEAR NUMBER | | | | | |
|---|---|---|---|---|---|---|
| | 6 | 5 | 4 | 3 | 2 | 1 |
| 1 | STATOR S-2,3,4,5 ROTOR — | STATOR S-2,3,4,5 ROTOR N-1,3,5,7 | STATOR S-2,3,4,5 N-7,8,9,1 ROTOR — | STATOR S-2,3,4,5 ROTOR N-1,2,3,4,5,6,7,8 | STATOR S-2,3,4,5 N-7,8,9,1 ROTOR N-1,3,5,7 | STATOR S-2,3,4,5 N-7,8,9,1 ROTOR N-1,2,3,4,5,6,7,8 |
| 2 | STATOR S-3,4,5,6 ROTOR — | STATOR S-3,4,5,6 ROTOR N-1,3,5,7 | STATOR S-3,4,5,6 N-8,9,1,2 ROTOR — | STATOR S-3,4,5,6 ROTOR N-1,2,3,4,5,6,7,8 | STATOR S-3,4,5,6 N-8,9,1,2 ROTOR N-1,3,5,7 | STATOR S-3,4,5,6 N-8,9,1,2 ROTOR N-1,2,3,4,5,6,7,8 |
| 3 | STATOR S-4,5,6,7 ROTOR — | STATOR S-4,5,6,7 ROTOR N-1,3,5,7 | STATOR S-4,5,6,7 N-9,1,2,3 ROTOR — | STATOR S-4,5,6,7 ROTOR N-1,2,3,4,5,6,7,8 | STATOR S-4,5,6,7 N-9,1,2,3 ROTOR N-1,3,5,7 | STATOR S-4,5,6,7 N-9,1,2,3 ROTOR N-1,2,3,4,5,6,7,8 |
| 4 | STATOR S-5,6,7,8 ROTOR — | STATOR S-5,6,7,8 ROTOR N-1,3,5,7 | STATOR S-5,6,7,8 N-9,1,2,3 ROTOR — | STATOR S-5,6,7,8 ROTOR N-1,2,3,4,5,6,7,8 | STATOR S-5,6,7,8 N-9,1,2,3 ROTOR N-1,3,5,7 | STATOR S-5,6,7,8 N-9,1,2,3 ROTOR N-1,2,3,4,5,6,7,8 |
| 5 | STATOR S-6,7,8,9 ROTOR — | STATOR S-6,7,8,9 ROTOR N-1,3,5,7 | STATOR S-6,7,8,9 N-2,3,4,5 ROTOR — | STATOR S-6,7,8,9 ROTOR N-1,2,3,4,5,6,7,8 | STATOR S-6,7,8,9 N-2,3,4,5 ROTOR N-1,3,5,7 | STATOR S-6,7,8,9 N-2,3,4,5 ROTOR N-1,2,3,4,5,6,7,8 |
| 6 | STATOR S-7,8,9,1 ROTOR — | STATOR S-7,8,9,1 ROTOR N-1,3,5,7 | STATOR S-7,8,9,1 N-3,4,5,6 ROTOR — | STATOR S-7,8,9,1 ROTOR N-1,2,3,4,5,6,7,8 | STATOR S-7,8,9,1 N-3,4,5,6 ROTOR N-1,3,5,7 | STATOR S-7,8,9,1 N-3,4,5,6 ROTOR N-1,2,3,4,5,6,7,8 |
| 7 | STATOR S-8,9,1,2 ROTOR — | STATOR S-8,9,1,2 ROTOR N-1,3,5,7 | STATOR S-8,9,1,2 N-4,5,6,7 ROTOR — | STATOR S-8,9,1,2 ROTOR N-1,2,3,4,5,6,7,8 | STATOR S-8,9,1,2 N-4,5,6,7 ROTOR N-1,3,5,7 | STATOR S-8,9,1,2 N-4,5,6,7 ROTOR N-1,2,3,4,5,6,7,8 |
| 8 | STATOR S-9,1,2,3 ROTOR — | STATOR S-9,1,2,3 ROTOR N-1,3,5,7 | STATOR S-9,1,2,3 N-5,6,7,8 ROTOR — | STATOR S-9,1,2,3 ROTOR N-1,2,3,4,5,6,7,8 | STATOR S-9,1,2,3 N-5,6,7,8 ROTOR N-1,3,5,7 | STATOR S-9,1,2,3 N-5,6,7,8 ROTOR N-1,2,3,4,5,6,7,8 |
| 9 | STATOR S-1,2,3,4 ROTOR — | STATOR S-1,2,3,4 ROTOR N-1,3,5,7 | STATOR S-1,2,3,4 ROTOR — | STATOR S-1,2,3,4 ROTOR N-1,2,3,4,5,6,7,8 | STATOR S-1,2,3,4 ROTOR N-1,3,5,7 | STATOR S-1,2,3,4 ROTOR N-1,2,3,4,5,6,7,8 |

ELECTRONICALLY CONTROLLED ELECTRIC MOTOR WITH VARIABLE POWER OUTPUT

The present invention relates to electric motors and, more particularly, electromagnetic motors of the type which utilize a combination of electromagnets and permanent magnets to effect precisely controlled radial rotation between the motor components.

BACKGROUND OF THE INVENTION

Electric motors employing a combination of electromagnets and permanent magnets for the purposes identified in the preceding paragraph are disclosed in a number of previously issued U.S. patents. Those of which I am aware are Nos.:

673,980 issued May 14, 1901, to Engelhardt for ELECTROMAGNET MOTOR;

722,042 issued Mar. 3, 1903, to Poly Aguirre for ELECTROMAGNETIC MOTOR;

1,907,221 issued May 2, 1933, to Smulski for ELECTRIC MOTOR;

1,992,137 issued Feb. 19, 1935, to Zeininger for ELECTRIC MOTOR;

2,281,081 issued Apr. 28, 1942, to Sheldon for ELECTROMAGNET MOTOR;

2,404,331 issued July 16, 1946, to Werner for ELECTROMAGNETIC MOTOR;

2,374,998 issued May 1, 1945, to Hitchcock for PERMANENT MAGNET ELECTRIC MOTORS;

2,864,018 issued Dec. 9, 1958, to Aeschmann for IMPULSE MOTOR;

2,922,943 issued Jan. 26, 1960, to Rupp for ELECTRIC MACHINE;

2,968,755 issued Jan. 17, 1961, to Baermann for MAGNETIC MOTOR 3,072,812 issued Jan. 8, 1963, to Gaddes for PERMANENT MAGNET MOTOR;

3,331,973 issued July 18, 1967, to McClure for MAGNETIC MOTOR;

3,670,189 issued June 13, 1972, to Monroe for GATED PERMANENT MAGNET MOTOR;

4,025,807 issued May 24, 1977, to Clover et al. for ELECTROMAGNETIC MOTOR;

4,305,024 issued Dec. 8, 1981, to Kuroki for MAGNETIC MOTOR;

4,357,551 issued Nov. 2, 1982, to Dulondel for D.C. IMPULSION MOTOR;

4,361,790 issued Nov. 30, 1982, to Laesser et al. for ELECTROMAGNETIC MOTOR ROTATABLE IN EITHER DIRECTION;

4,564,778 issued Jan. 14, 1986, to Yoshida for DC BRUSHLESS ELECTROMAGNETIC ROTARY MACHINE;

A major disadvantage of the prior art of permanent magnet motors is that they are unable to vary the amount of rotational power required. As a result, the size, and therefore power usage, of a motor is determined by the amount of energy required to perform the work at the moment of heaviest load. Therefore, energy is wasted at all times other than at the moment of heaviest load.

Also, permanent magnet type motors have been plagued by a low starting torque. Another common disadvantage of existing permanent magnet motors is the difficulty of stopping the rotor of the motor in a precise position with respect to the stator. Additionally, existing permanent magnet motors have not been designed to enable the rotor to be locked in a fixed position relative to the stator, without using a rachet or other relatively quick wearing mechanical device (see the discussion in Aeschmann U.S. Pat. No. 2,864,018).

Another important disadvantage of many existing permanent magnet motors is the make-and-break type mechanical switching which is employed to energize the electromagnets of the motor in the sequence needed to cause the armature of the motor to rotate. These switching devices generate sparks, and motors employing them consequently cannot be used in flammable or explosive environments unless the motor is encased in an expensive explosion proof housing, which makes their use impractical in many circumstances. See examples of such mechanical switching devices disclosed in Sheldon U.S. Pat. No. 2,281,081; Hitchcock U.S. Pat. No. 2,374,998; Rupp U.S. Pat. No. 2,922,943; Baermann U.S. Pat. No. 2,968,755; and McClure U.S. Pat. No. 3,331,973.

SUMMARY OF THE INVENTION

I have discovered that the above mentioned disadvantages of previously proposed motors using a combination of permanent magnets and electromagnets can be overcome by a unique motor construction which has a relatively rotatable armature (or rotor) and stator and the following characteristics: (1) all of the magnets incorporated in one of the previously mentioned components are permanent magnets which are preferrably augmented with windings so that at the operator's discretion these permanent magnets can be converted to electromagnets to provide additional power to the motor, and all of the magnets incorporated in the other of the components are electromagnets; (2) all of the convertible permanent magnets are oriented so that the same pole of each magnet (north or south) faces the air gap between that motor components; (3) the relationship between the number of electromagnets (EM) and convertible permanent magnets (PM) is defined by the equation EM=PM+/−1, where EM is > or equal 3 and PM is > or equal 3; (4) the core of each of the electromagnets is constructed from permeable material so that when the electromagnet is not energized its core will be attracted to the convertible permanent magnet on the other motor component; and (5) the poles of the electromagnets (as opposed to the convertible permanent magnets) are reversible, which allows the poles of all energized magnets facing the air gap to be selected as either north or south and therefore create either an attraction or a repulsion force relative to the nearest convertible permanent magnet located on the other motor component.

One significant advantage of using this novel arrangement of electromagnets and convertible permanent magnets is that the windings can be energized in selected numbers and in different sequences, through use of commercially available position encoders and controllers, to vary the number and direction of interacting magnetic poles and therefore the power of the motor. This process results in multiple controllable levels of power output at the same speed of rotation (up to six in the motor demonstrated in the drawings which are part of this application).

Another advantage of using this novel arrangement of electromagnets and convertible permanent magnets is that a smooth running motor can be obtained. When the rotor of a motor employing this principle is rotating, power is constantly being applied to multiple electromagnets, creating a smooth source of constant power rather than a source which is being interrupted by the change in polarity of the electromagnets at least once during each rotation, as is done in many motors currently available.

Another advantage is that motors employing this novel arrangement have an extremely high start-up torque and accordingly can be started up under heavier loads than motors using conventional methods.

Another advantage of these novel motors is that they can be made to operate over a wide range of speeds simply by varying the elapsed time over which the electromagnets are energized and deenergized. Still another advantage of this new arrangement is that the direction of rotation of the motor can be reversed and it will still operate with the same ease, power, control, and functionality.

Still another advantage of the novel motors I have invented and disclosed herein is that the rotating component of the motor may be stopped in any one of a large number of precise relationships relative to the stationary component of the motor. This makes my novel motor particularly useful as stepping and oscillating motors and in robotic and other applications where precise manipulation of a robotic arm or other mechanism is required.

Related advantages of these motors are that the capabilities which allow them to start under high torque also allow them to stop quickly and to brake or hold a load in a slow moving or stopped position. They can accordingly be used to advantage in applications requiring braking by the motor.

Versatility is another significant advantage of the novel electric motors disclosed herein. They may be manufactured in a variety of diameters with different power outputs, and/or multiple segments, each including two relatively rotatable magnet bearing components, axially aligned and drive-connected together to provide a motor with a higher power output.

These new motors may be operated from either a.c. or d.c. power sources.

The motors I have invented are also efficient and are comparable to a synchronous motor in this respect. However, at the same time these motors are comparable in performance to, and have all the advantages of, a brushless d.c. motor. But, unlike the latter, they can be used in an explosive or flammable environment without use of an explosion proof casing. This is a significant economic advantage because of the high cost of explosion proof motors.

OBJECTS OF THE INVENTION

From the foregoing it will be apparent to the reader that one important and primary object of this invention resides in the provision of novel, improved, electric motors.

Other important, yet related, objects of my invention are the provision of electric motors which:
contain multiple levels of power output at the same speed of rotation;
are smooth running;
have a high start-up torque and can be started under full load;
are reversible and have a wide range of operating speeds; are particularly suited for use as stepping motors and in robotic and other applications requiring that the mechanism operated by the motor be manipulated with a high degree of precision;
are particularly suited for use in applications in which a braking function is required;
are efficient and economical to operate;
are versatile in that they can be produced in a wide range of sizes and power outputs;
are flexible in that they can be operated from either an a.c. or d.c. electrical current;
employ convertible permanent magnets in one of two relatively rotating motor components and electromagnets in the other of those components with the number of electromagnets being either one less or one more than the number of convertible permanent magnets (but greater than three) and all the convertible permanent magnets being oriented with the same pole facing the air gap between the two components of the motor and with the core of the electromagnets constructed of a permeable material which, when the electromagnet is deenergized, will be magnetically attracted to the convertible permanent magnet nearest it;
are simple and economical to produce.

Other important objects and features and additional advantages of my invention may become apparent to the reader as he studies the above list, the detailed description, the related drawings, and the accompanying claims.

BRIEF DESCRIPTION OF THE DRAWING

In the drawing:

FIG. 9 is a chart showing the electromagnet energization pattern for the first ten exemplary positions of 72 positions of the rotor of the motor shown in FIG. 1 and the attracting and repelling forces exerted by that motor's magnets with the motor in each of those exemplary positions, when it is operated in its least powerful level of power output, where only four of the 16 possible electromagnets are being energized and the motor is being operated in a continuous, clockwise direction; and FIG. 10 is a chart showing the electromagnet energization pattern for the first ten exemplary positions of the motor shown in FIG. 1 and the attracting and repelling forces exerted by that motor's magnets with the motor in each of those exemplary positions, when it is operated in its least powerful level of power output, where only four of the 16 possible electromagnets are being energized and the motor is being operated in an oscillating or reversing mode; and FIG. 11 is a chart showing the electromagnet energization pattern for the first ten exemplary positions of the motor shown in FIG. 1 and the attracting and repelling forces exerted by that motor's magnets with the motor in each of those exemplary positions, when it is operated an its least powerful level of power output, where only four of the 16 possible electromagnets are being energized and the motor is being operated in a stepping mode; and FIG. 12 is a chart showing the electromagnet energization pattern for ten exemplary positions of the motor shown in FIG. 1 and the attracting and repelling forces exerted by that motor's magnets when it is locked in those exemplary positions; and FIG. 13 is a chart showing which of the stator and rotor magnets are in direct allignment for each of the 72 positions of one full rotation of the motor shown in FIG. 1; and FIG. 14 is a chart showing the first nine exemplary positions of the 72 possible positions and related wire energization and pole designation for all six possible operator-selectible levels of power output for the motor shown in FIG. 1.

DETAILED DESCRIPTION OF THE INVENTION

Figure 1:
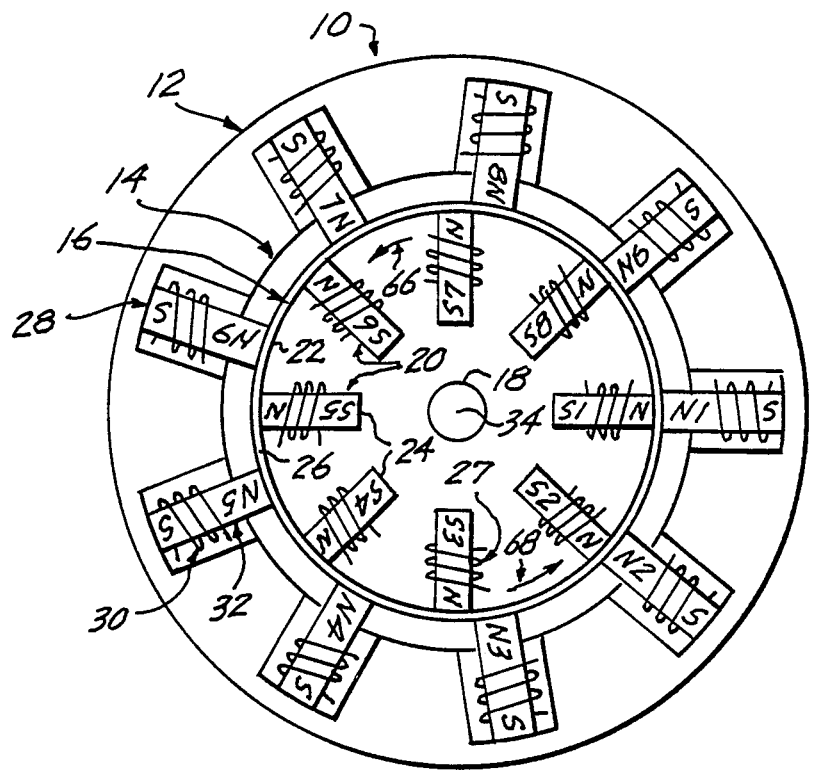
FIG. 1 is a somewhat pictorial view of an electrical motor embodying the principles of this novel invention, one end of the motor housing being removed to expose the inner components of the motor.

Referring now to the drawings, FIG. 1 depicts a permanent magnet motor constructed in accord with, and embodying, the principles of the present invention.

One major component of motor 10 is a casing 12. Housed within that casing are a stationary component or stator 14 and a relatively rotatable component 16, which also may be referred to as a rotor or armature. The rotor is mounted on a shaft 18 which is rotatably supported in appropriate bearings (not shown) at opposite ends of motor casing 12.

Seated in blind recesses 20 spaced equiangularly and circumferentially symetric around the periphery 22 of rotor 16 are a series of eight flush-mounted, permanent magnets 24. These magnets are oriented with their major axes lying along radii of rotor 16, and they are oriented so that the same pole of each magnet (north in the illustrated motor) faces the air gap 26 between the rotor 16 and the stator 14 of the motor. They are wrapped with windings 27 through which electric current can pass thereby converting the permanent magnets to electromagnets to boost the power output. As electromagnets they are more powerful and generate more torque than when operating as permanent magnets. The ability to convert these magnets from permanent to electromagnets and back produces part of variable power output feature, which greatly increases the flexibility and usefulness of the motor.

Samarium-cobalt magnets or other highly effective magnetic material may be employed to maximize the power output-to-size ratio of motor 10. However, these magnets are relatively expensive. Consequently, when size and weight are not controlling criteria, magnets fabricated from a less expensive material such as an Alnico (aluminum-nickel-cobalt) alloy can be employed instead at a considerable savings in cost.

Cooperating with convertible permanent magnets 24 to effect rotation of armature 16 is a series of nine electromagnets 28, each consisting of a winding 30 on a core 32. Like convertible permanent magnets 24, electromagnets 28 are spaced equiangularly and circumferentially symetric around the stator 14 and are each oriented with their major axes lying along radii originating on the axis of rotation 34 of motor 10. The core 32 of each electromagnet 28 extends to the air gap 26 between the rotor 16 and stator 14 of motor 10, and the cores are fabricated from a permeable material such as soft iron, which will become demagnetized when the electromagnet is deenergized.

Electromagnets 28 are mounted on the stator 14 of motor 10.

It will be noted from the foregoing that the number of electromagnets 28 in motor exceeds the number of convertible permanent magnets 24 by one. Thus motor 10 fulfills the requirement expressed above that the relationship between the number of electromagnets and convertible permanent magnets satisfy the equation $EM = PM +/- 1$, in which EM > or equal 3 and PM is > or equal 3 where EM is the number of electromagnets in the motor, and PM is the number of convertible permanent magnets.

The operation of motor 10 at power output level number 6 will now be described. Associated with the mechanical or structural components of motor 10 discussed above is a system for so energizing the windings 30 of electromagnets 28 that those magnets will cooperate with the rotor mounted convertible permanent magnets 24 to bring about the rotation of rotor 16 in the manner and modes described and illustrated in FIGS. 8 through 12. To this end, the windings 30 of the electromagnets 28 are so energized that any energized electromagnet will have a pole of the same polarity as convertible permanent magnets 24 (north in the illustrated exemplary motor) facing the air gap 26 between the rotor 16 and stator 14 of motor 10.

Figure 6:
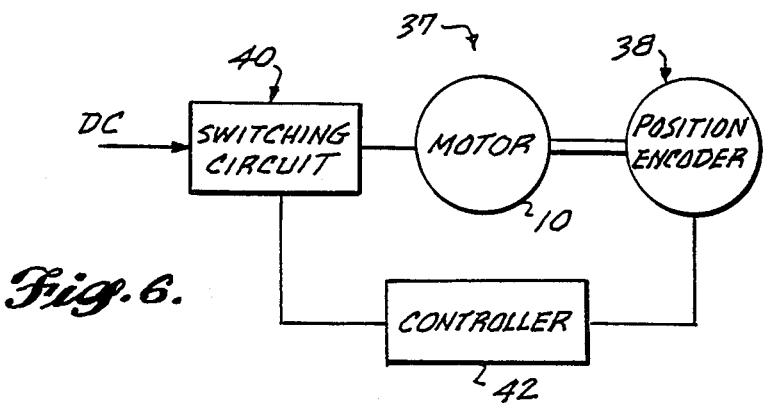
FIG. 6 shows, in schematic form, one system for controlling the opening and closing of the switches in the switching circuit shown in FIG. 2.

One exemplary system for controlling the operation of motor 10 in the manner just described in illustrated in FIG. 6 and identified by reference character 37. The major components of control system 37 include a position encoder 38 for continuously detecting the position of rotor 16 to stator 14, an electronic switching circuit 40 for energizing the windings 30 of electromagnets 28 in a predetermined sequence which will further the purposes discussed above, and a microprocessor-based or other solid state, sequencing controller 42. Sequencing controller 42 transmits triggering signals to the various switches in curcuit 40 to effect the closing and opening of those switches in a sequence and pattern dictated by information regarding the position of rotor 16 relative to stator 14 supplied to controller 42 by position encoder 38.

Optical encoders may be employed to advantage in control system 37 to detect the position of rotor 16. Suitable optical encoders are available from Litton Industries, Honeywell, Inc., and other sources. Appropriate controllers which can be employed to operate the switches in switching system 40 in the appropriate sequence and as rotor 16 reaches specific angular positions relative to stator 14 as reported by position encoder 38 are also commercially available.

Figure 2:
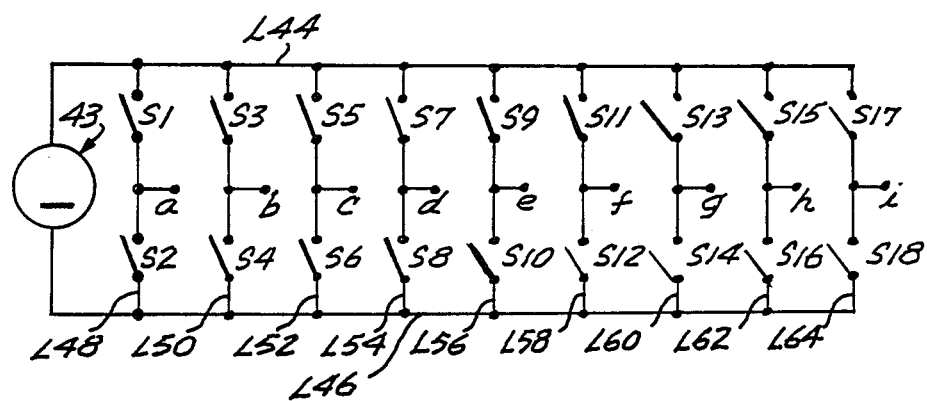
FIG. 2 is a schematic of a switching circuit for energizing electromagnets employed in the stator of the motor shown in FIG. 1.

For the exemplary motor 10 with its nine electromagnets 28, a switching circuit 40 with nine pairs of transistorized or other solid state power switches S1 and S2, S3 and S4 ... S17 and S18 is employed. The switch pairs are connected in parallel across an a.c. power source 43 by main leads L44 and L46 and branch leads L48 ... L64 as shown in FIG. 2. The two switches in each pair are located on each side of a center tap (a ... i in FIGS. 2 and 3)—for example, electronic switches S1 and S2 are located on opposite sides of the center tap a from branch lead L48.

Figure 3:
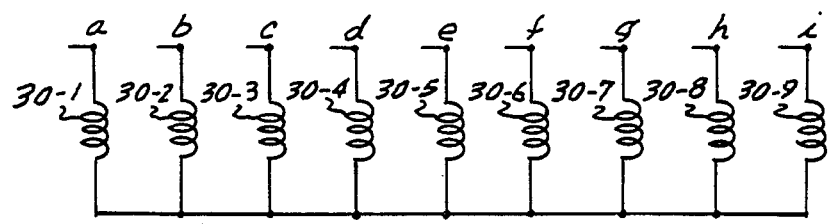
FIG. 3 is a schematic showing the manner in which the windings of the electromagnets in the stator of the motor shown in FIG. 1 are connected.

It will be apparent from FIGS. 2 and 3 that with either of the two switches in a lead L48 ... L64 closed, the winding 30-1 ... 30-9 connected to that lead by way of the associated center tap a ... i will be energized.

Figures 7, 8:
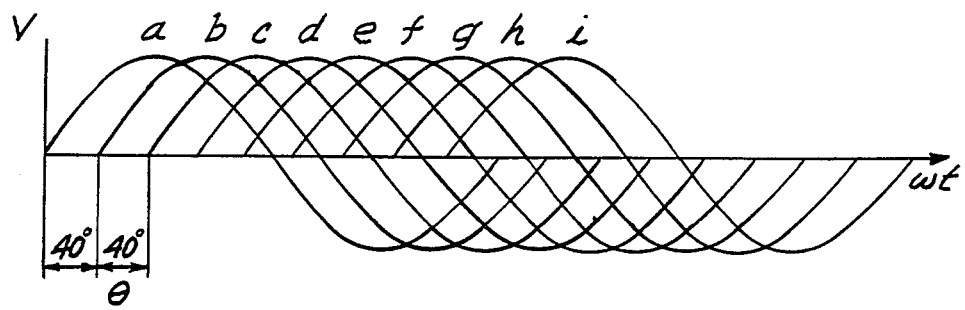
FIG. 7 is a graph showing the phase relationship of the currents flowing through the electromagnet windings in the stator of the motor of FIG. 1.
FIG. 8 is a chart showing the electromagnet energization pattern for the first ten exemplary positions of 72 positions of the rotor of the motor shown in FIG. 1 and the attracting and repelling forces exerted by that motor's magnets with the motor in each of those exemplary positions, when it is operating in its least powerful level of power output, where only four of the 16 possible electromagnets are being energized and the motor is being operated in a continuous conterclockwise direction.

For the exemplary motor 10 with nine electromagnets 28 shown in FIG. 1, operating in power output level number six, as shown on FIG. 9, four of the electromagnet windings 30-1 ... 30-9 are energized at any one time for a continuously running motor. The switches are closed in the sequence shown in exemplary part in FIG. 8 and in a time relationship such that the current flowing through the windings 30-1 ... 30-9 will be 40 degrees (360/9) out-of-phase. The waveforms (idealized) are shown in FIG. 7 and identified by the same number as appended to the reference characters identifying the electromagnet windings as suffixes; i.e., the numerals 1 through 9.

One switch in each pair (e.g., S1) will be closed when the voltage across a.c. power source 43 is one polarity, and the other switch in that pair (S2 in the example) will be closed when the polarity changes, if it is appropriate for the position of rotor 16 detected by encoder 38 that the associated winding (here, 30-1) remain energized over a period which embraces a change in polarity. This ensures that the polarity of the energized electromagnet remains unchanged while it is energized as is essential to the intended operation of motor 10.

To describe the operation of motor 10 in power output level number six as described in FIG. 9, it will first be assumed that the motor is stopped. This can be done with rotor 16 precisely located relative to stator 14 and effectively locked against rotation with respect to stator 14 by energizing the windings 30 of an appropriate pair of two adjacent electromagnets 28.

For example, to stop rotor 16 in the position shown in FIG. 1 and/or to lock the rotor in that postion, the windings 30-8 and 30-9 of those electromagnets 28 identified as Nos. 8 and 9 are energized with convertible permanent magnet 6 at, or approaching, the illustrated position midway between those electromagnets. This provides strong, equally balanced, oppositely directed forces repelling convertible permanent magnet 6 away from each of the two electromagnets 28 between which it is equidistantly positioned. The forces attracting the remaining convertible permanent magnets 24-2 ... 24-8 toward the cores 32 of the remaining eight electromagnets 28-2 ... 28-9 are balanced. Consequently, rotor 16 will tend to remain precisely in this designated position even if it is under load.

Because motor 10 has eight convertible permanent magnets and nine electromagnets, there are 72 (9×8) positions 5 degrees (360/72) apart in which rotor 16 can be precisely oriented relative to stator 14 by virtue of the just-described attraction between convertible permanent magnets 24 and electromagnets 28. This makes motor 10 eminently suitable for applications requiring a stepping motor and in computer disc drives, industrial robot, and other applications where precise advance of the electric drive motor is required.

In applications such as those described in the preceding paragraph, pulsed current may be employed to step the rotor 16 of motor 10. In that case, a controller 42 capable of triggering switching circuit 40 in a manner that will supply pulses of current of an appropriate duration and in an appropriate sequence to the windings 30 of electromagnets 28 can be employed. Or, if more versatility in the operation of motor 10 can be utilized advantageously, one may employ a sequencing controller that can be programmed to cause switching system 40 to supply either pulsed current to the electromagnet windings 30 to provide a stepping motor type of operation or continuous current to provide a type of operation emulating that of a synchronous motor and a brushless d.c. motor.

With the rotor 16 or motor 10 so halted that convertible permanent magnet 24-1 is opposite electromagnet 28-1 and the current to the motor then turned on, the sequencing controller 42 will cause the apropriate switches S1 ... S18 to be closed in the manner required to energize the windings 30-1, 30-7, 30-8, and 30-9 of electromagnets 28-1, 28-7, 28-8, and 28-9 with north poles of those electromagnets facing the air gap 26 between rotor 16 and stator 14 (in the illustrated, exemplary motor 10 with its nine electromagnets, four of those electromagnets are energized at any given time during the continuous rotation mode of operation, and the other five windings are deenergized).

As is apparent from FIGS. 1 and 8, this will create strong, though progressively smaller, forces of repulsion between: (a) convertible permanent magnet 24-1 and electromagnet 28-1, (b) convertible permanent magnet 24-8 and electromagnet 28-9, (c) covertible permanent magnet 24-7 and electromagnet 28-8, and (d) convertible permanent magnet 24-6 and electromagnet 28-7. These several forces of repulsion all tend to drive the rotor 16 of motor 10 in the counterclockwise direction identified by arrows 66 and 68 in FIG. 1.

Also, because the remaining four convertible permanent magnets 24-2 ... 24-5 are nearer the four unenergized electromagnets 28-5, 28-4, 28-3 and 28-2, the forces of attraction between those four convertible permanent magnets and the soft iron cores 32 of the just-identified electromagnets will be greater than the forces of attraction between the same convertible permanent magnets and the unenergized electromagnets on the opposite side of those convertible permanent magnets (28-3, 28-4, 28-5, and 28-6). Consequently, the net forces of attraction available when motor 10 is started from the rotor position under discussion also act to displace rotor 16 in the direction identified by arrow 66 and 68.

This same combination of forces of repulsion and forces which will turn rotor 16 in the direction indicated by arrows 66 and 68 is also available as rotor 16 continues in that direction, and the electromagnets of the rotor are energized in an appropriate pattern for each subsequent 5 degree apart position of the rotor. The sequence of patterns in which the electromagnets is energized is shown for the first nine of those positions in FIG. 8.

It will be apparent from the drawing and the foregoing that the speed of motor 10 can be varied over a wide range by varying the frequency with which the windings 30 of electromagnets 28-1 . . . 28-9 are energized. When this frequency reaches the switching time (pulse width modulation or similar methods) of the current on which motor 10 in operated, the operation of the motor will essentially duplicate that of a synchronous motor, providing the efficiency and other advantages which that type of motor has. At the same time and as it does over its entire speed range, motor 10 will continue to operate as a brushless d.c. motor; and it will, therefore, also have the advantage which that type of motor provides including large starting torque, ruggedness, high efficiency, and ease with which the speed of the motor can be controlled.

It was also mentioned above that a motor as shown in the drawing is capable of being run in reverse. The foregoing discussion of that motor will make it apparent to those skilled in the relevant arts that this can be easily and readily accomplished merely by changing the sequence in which the sets of four electromagnets are energized (and, perhaps, the electromagnets in each of those sets). Again, this is a capability which would typically be possessed by the conventional microprocessor-based or comparable type of solid state controller that is preferably utilized to control electronic switching system 40.

Figure 5:
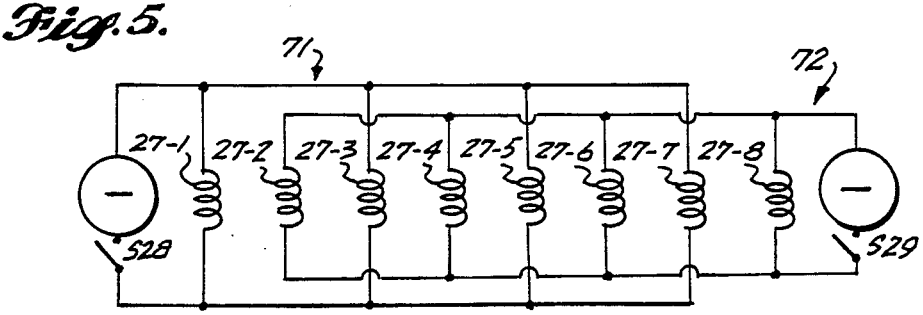
FIG. 5 shows a schematic representation of the windings and switching circuits of the convertible permanent magnets on the rotor of the motor shown in FIG. 1.

As is referred to above, this new motor 10 includes the novel concept of multiple levels of power output from the same motor. As shown in FIG. 9, there are two combinations of energization of windings 30, which provides two of the levels, and three combinations of energization of windings 27 around the convertible permanent magnets, which provides the total of six combinations. The three combinations for energizing the windings 27 of the convertible permanent magnets of the illustrated motor 10 are: (1) no windings energized, (2) four windings energized to convert alternate (even or odd numbered) magnets into electromagnets having the same magnetic pole (north or south but north in the illustrated motor 10) facing the airspace 26 between the rotor 16 and the stator 14 as the permanent magnet 24, and (3) all eight windings energized to convert all permanent magnets to electromagnets as described in (2). The wiring of windings 27 are illustrated in FIG. 5. There are two separate wiring systems, one for even numbered magnets 72 and one for odd numbered magnets 71. These systems may be controlled through the same controller system that operates the electromagnets 28 on the stator 14 or through a separate but much simpler system in which the changing of power output levels is accomplished through a dual toggle switching system (not illustrated) wherein a switch for each system is either in an "on" or and "off" position, thereby determining whether the wirings of the convertible permanent magnets are energized.

Many physical variations of the illustrated motor are of course within the scope of my invention. For example, the inner rotor 16 may be designed as the stationary component and the outer component 14 allowed to rotate about that now stationary component. Or, at the expense of its "brushless" characteristics, the illustrated motor may be redesigned with electromagnets carried by its moving rotor and convertible permanent or permanent magnets carried by its stationary stator, and, as long as the relationship EM=PM+/−1, but >3 is maintained, the number of convertible permanent magnets and electromagnets can be increased or decreased to the optimum number for a particular application of the invention.

Figure 4:
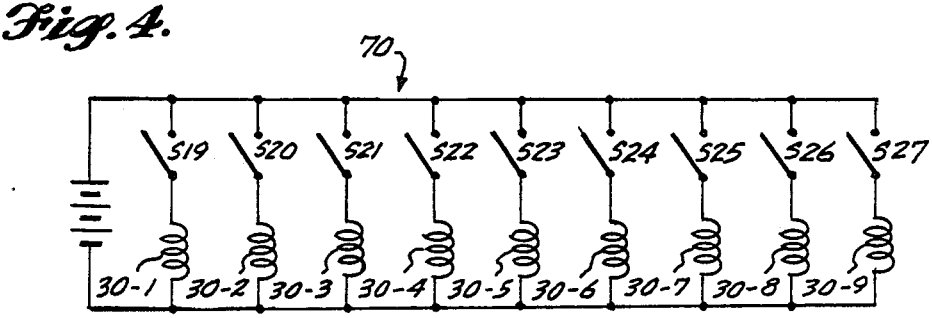
FIG. 4 is a schematic similar to FIG. 2 but showing a simpler switching circuit that can be employed if the motor is to be operated from a d.c. power source.

Also, variations may be made in the system by which a motor embodying the principles of my invention is controlled without exceeding the scope of that invention. FIG. 4, for example, depicts a switching system 70 which can be utilized to operate a motor as disclosed herein on d.c. power.

Switching circuit 70 resembles the circuit 40 of that character described above except that the number of switches (identified as S-19 . . . S-27) is halved, a simplification made possible because there is no need to accommodate the reversal in the direction of current flow appurtenant to the operation of the motor on a.c. power.

Switching curcuit 70 can be operated by the same type of controller as switching circuit 40; and, like the latter, it functions to control the flow of current to the windings 30-1 . . . 30-9 of electromagnets 28 at the proper time and in the proper sequence.

It will be apparent from the preceding paragraph that the invention may be embodied in other specific forms without departing from the spirit or essential characteristics thereof. The present embodiment is therefore to be considered in all respects as illustrative and not restrictive, the scope of the invention being indicated by the appended, claims rather than by the foregoing description; and all changes which come within the meaning and range of equivalency of the claims are therefore intended to be embraced therein.

What is claimed is:

1. An electromagnetic motor comprising:
    relatively rotatable components having an axis of rotation and defining an annular air gap therebetween that is coaxial with said axis of rotation;
    a set of electromagnets (EM) mounted on one of said components and being equiangularly and symmetrically spaced about said axis of rotation and lying adjacent said air gap;
    a set of permanent magnets (PM) mounted on the other of said components and being equiangularly and symmetrically spaced about said axis of rotation and lying adjacent said annular air gap, said set of permanent magnets (PM) arranged so that like poles (north or south) face said air gap for registration with said set of electromagnets (EM), and wherein said set of electromagnets (EM) is $\geq 3$, said set of permanent magnets (PM) is $\geq 3$, and EM=PM±1 so that only one of said permanent magnets can be positioned at a time in exact registration across said air gap with one of said electromagnets (EM);
    switching means for selectively connecting electrical current to individual ones of said electromagnets (EM) so that they are energized to cause selected poles (north or south) to be presented at said air gap;
    sensing means for sensing the relative angle of rotation between said components; and
    control means connected between said sensing means and said switching means for causing said switching means to selectively and sequentially energize said electromagnets (EM) so that certain of said electromagnets (EM) have poles that attract said permanent magnets (PM) and others of said electromagnets (EM) have poles that are repulsed by said permanent magnetics (PM) so as to selectively and controllably cause said components to: (i) rotate clockwise; (ii) rotate counter-clockwise; (iii) step from one rotational position to another; (iv) oscillate between predetermined rotational positions; (v) brake relative rotation; and (vii) lock in a predetermined rotational position, whereby the electromagnetic motor has a variety of selectable operating modes.

2. An electromagnetic motor as defined in claim 1, wherein the permanent magnets (PM) have windings, and said switching means and control means include means for selectively and sequentially energizing said windings of said permanent magnets (PM) in coordination with the selective and sequential energization of said electromagnets.

3. An electromagnetic motor as defined in claim 2, wherein said control means has program means for selectively energizing less than all of said windings of said permanent magnets (PM) so as to cause a variable amount of power to be generated by the motor while operating at substantially the same rotational speed.

4. An electromagnetic motor as defined in claim 1, wherein each of said electromagnets (EM) has a magnetically permeable core that extends to said air gap and which is substantially unmagnetized when de-energized.

5. An electromagnetic motor as defined in claim 1, includes two or more power sections aligned and coupled in an end-to-end relationship, each of said sections comprising a pair of said rotatable components including said sets of electromagnetics (EM) and permanent magnets (PM) cooperating with said switching means, sensing means and control means.

6. An electromagnetic motor as defined in claim 2, wherein said control means includes means for selectively energizing circumferentially alternate ones of said windings of said permanent magnets (PM) so as to cause a variable amount of power to be generated by the motor.

7. The electromagnetic motor of claim 2, wherein said control means includes means for selectively energizing N of said windings of said permanent magnets (PM) wherein N<PM, and the ratio of PM to N is equal to a whole number integer, such as 2, 3, 4. - - - .

8. The electromagnetic motor of claim 1, wherein said poles of said permanent magnets (PM) are arranged radially with respect to said axis of rotation.

9. The electromagnetic motor of claim 8, wherein said electromagnets have their poles, when energized, oriented radially with respect to said axis of rotation.

10. An electromagnetic motor as defined in claim 1, wherein said sensing means comprises an angle of rotation encoder having an electrical signal output representing the instantaneous relative angle of rotation between said rotatable components.

11. An electromagnetic motor comprising:
relatively rotatable stator and rotor components having an axis of rotation and defining an annular air gap therebetween that is coaxial with said axis of rotation;
a set of electromagnets (EM) mounted on one of said components and being equiangularly spaced about said axis of rotation and lying adjacent said air gap;
a set of convertible permanent magnets (PM) and associated windings mounted on the other of said components and being equiangularly spaced about said axis of rotation and lying adjacent said annular air gap, said set of convertible permanent magnets (PM) is arranged so that like poles (north or south) there of face said annular air gap for registration with said set of electromagnets (EM), and wherein said set of electromagnets (EM) is ≧3, said set of convertible permanent magnets (PM) is ≧3, and EM=PM±1 so that only one of said convertible permanent magnets (PM) can be positioned at a time in exact registration across said air gap with one of said electromagnets (EM);
switching means for selectively connecting electrical current to individual ones of said electromagnets (EM) so that they are energized to cause a selected pole (north or south) to be presented at said air gap;
sensing means for sensing the relative angle of rotation between said components; and
control means connected between said sensing means and said switching means for causing said switching means to selectively and sequentially energized said electromagnets (EM) so that certain of said electromagnets (EM) have poles that attract said convertible permanent magnets (PM), and others of said electromagnets (EM) have poles that are repulsed by said convertible permanent magnetics (PM) controllably causing said components to: (i) rotate clockwise; (ii) rotate counter-clockwise; (iii) step from one rotational position to another; (iv) oscillate between predetermined rotational positions; (v) brake relative rotation; and (vii) lock in a predetermined rotational position, and said control means further having means for selectively energizing said associated windings of said convertible permanent magnets for varying the power input and output of the motor, whereby the electromagnetic motor has a variety of selectable operating modes.

12. An electromagnetic motor as defined in claim 11, wherein said control means selectively energizes less than all of said associated windings of said convertible permanent magnets (PM) to vary the power of the motor without changing its speed of rotation.

13. An electromagnetic motor of claim 11, wherein said electromagnets (EM) and said convertible permanent magnets (PM) are circumferentially symmetric about said axis of rotation so that the magnetic field of each electromagnetic (EM) is independent of the sense of rotation between said components.

14. An electromagnetic motor of claim 11, wherein the poles of said electromagnets and said convertible permanent magnets are aligned radially on said components with respect to said axis of rotation.

15. An electromagnetic motor comprising:
relatively rotatable stator and rotor components having an axis of rotation and defining an annular air gap therebetween that is coaxial with said axis of rotation;
a set of electromagnets (EM) mounted on one of said components and being equiangularly spaced about said axis of rotation and lying adjacent said air gap;
a set of convertible permanent magnets (PM) and associated windings mounted on the other of said components and being equiangularly spaced about said axis of rotation and lying adjacent said annular air gap, said set of convertible permanent magnets (PM) is arranged so that like poles (north or south) face said air gap for registration with said set of electromagnets (EM), and wherein said set of convertible permanent magnets (PM) is an even number and ≧4, and said set of electromagnets (EM) is equal to PM±1 so that only one of said convertible permanent magnets (PM) can be positioned at a time in exact registration across said air gap with one of said electromagnets (EM);

switching means for selectively connecting electrical current to individual ones of said electromagnets (EM) so that they are energized to cause a selected pole (north or south) to be presented at said air gap;

sensing means for sensing the relative angle of rotation between said components;

control means connected between said sensing means and said switching means for causing said switching means to selectively and sequentially energize said electromagnets (EM) so that certain of said electromagnets (EM) have poles that attract said convertible permanent magnets (PM), and other of said electromagnets (EM) have poles that are repulsed by said convertible permanent magnetics (PM) for controllably and selectively causing said components to: (i) rotate clockwise; (ii) rotate counter-clockwise; (iii) step from one rotational position to another; (iv) oscillate between predetermined rotational positions; (v) brake relative rotation; and (vii) lock in a predetermined rotational position; and wherein said control means includes variable power means having a first mode for selectively energizing all of said associated windings of said convertible permanent magnets (PM) and a second mode for selectively energizing less than all of said associated windings to vary the power of the motor without changing its speed of rotation.

16. The electromagnetic motor of claim 15, wherein said variable power means of said control means has means in its second mode for energizing an even number of said associated windings that are spaced at equiangular intervals around said axis of rotation.

17. An electromagnetic motor of claim 15, wherein said electromagnets (EM) and said convertible permanent magnets (PM) are circumferentially symmetric about said axis of rotation so that their magnetic fields are independent of the sense of rotation between said components.

18. An electromagnetic motor of claim 15, wherein the poles of said electromagnets and said convertible permanent magnets are arranged radially on said components with respect to said axis of rotation.

* * * * *